United States Patent [19]

Sakai et al.

[11] Patent Number: 4,915,740
[45] Date of Patent: Apr. 10, 1990

[54] HYDRAULIC MATERIAL COMPOSITION HAVING HIGH STRENGTH

[75] Inventors: Etsuo Sakai, Ichikawa; Tutomu Kida, Machida; Yasuhito Fushii; Yukio Sasagawa, both of Omuta, all of Japan

[73] Assignee: Denki Kagaku Kogyo Kabushiki Kaisha, Japan

[21] Appl. No.: 100,466

[22] Filed: Sep. 24, 1987

[30] Foreign Application Priority Data

Sep. 25, 1986 [JP] Japan .................................. 61-224902
Sep. 23, 1987 [JP] Japan .................................. 62-37890

[51] Int. Cl.⁴ .............................................. C04B 7/32
[52] U.S. Cl. ................................................... 106/104
[58] Field of Search ........................................ 106/104

[56] References Cited

U.S. PATENT DOCUMENTS

| 4,075,027 | 2/1978 | Knill et al. | 106/99 |
| 4,255,195 | 3/1981 | Holter et al. | 106/104 |
| 4,373,956 | 2/1983 | Rosskopf | 106/104 |
| 4,687,752 | 8/1987 | Peters | 106/104 |

Primary Examiner—Mark L. Bell
Attorney, Agent, or Firm—Darby & Darby

[57] ABSTRACT

A hydraulic material composition having high strength contains a hydraulic material containing as main ingredients an alkaline earth metal oxide and aluminum oxide ($Al_2O_3$), ultra-fine particles having a mean particle size smaller by one order or more than that of the hydraulic material, a metal aggregate and a plasticizer.

28 Claims, 3 Drawing Sheets

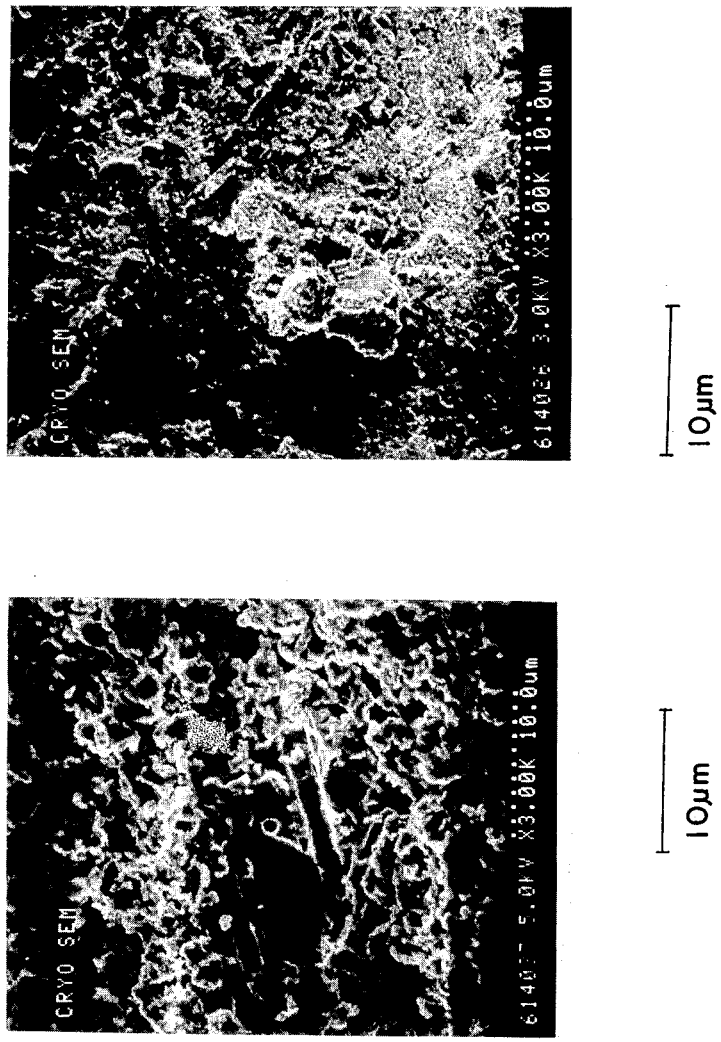

HYDRAULIC MATERIAL COMPOSITION HAVING HIGH STRENGTH

BACKGROUND OF THE INVENTION

This invention relates to a hydraulic material composition and more particularly to a hydraulic material composition having high strength above all an improved bending strength.

It is already known from PCT Laid-open Publication No. 55-500863 or Japanese Patent Publication No. 59182/1985 to produce a hardened body of high strength and dense structure by admixing a hydraulic inorganic material with ultra-fine particles smaller in size by one or two orders than the inorganic material, and also with a superplasticizer. It is also known from PCT laid-open Publication No. 61-502603 to use stainless steel particles as aggregate in combination with a Portland cement type hydraulic material. Although these conventional hydraulic material compositions have excellent structural density as compared with the conventional mortar or concrete compositions, they may be exploded due to water vapor at elevated temperatures. Thus, it cannot be said to be heat-resistant and the products obtained from these hydraulic material compositions are used in the range of 250 to 400° C. at most. In preparing molded products from these hydraulic material compositions, the problem of cracking due to thermal stress is yet to be solved. Both of the conventional hydraulic material compositions also suffer from a drawback that the bending strength thereof is lowered by dry curing at higher than 100° C.

A hydraulic material composition for castable refractories, also known in the art, poses no problem in heat resistance, but it is difficult to provide the composition with high strength, especially high bending strength. It is also difficult to provide the composition with transferability by cast molding while maintaining excellent fluidity. There are also other problems to be solved with the known composition, for example, considerable loss in strength at a medium temperature range of 400 to 900° C. and unstable transition temperature of hydrate formation which is at or close to room temperature.

As described above, a number of problems must be overcome if it is desired that a hydraulic material composition having excellent workability to permit cast molding at ambient temperatures and excellent transferability to the cast surface as well as superior heat resistance and high strength characteristics be produced from the hydraulic material.

OBJECTS AND SUMMARY OF THE INVENTION

It is a principal object of the present invention to provide a hydraulic material composition especially having high bending strength.

It is another object of the present invention to provide a high strength hydraulic material composition having excellent workability to permit cast molding at ambient temperature and also excellent transferability to the cast surface.

It is yet another object of the present invention to provide a hydraulic material composition having superior heat resistance and high strength.

These and other objects of the present invention will become apparent from the following description.

According to the present invention, there is provided a hydraulic material composition having high strength comprising a hydraulic material containing as main ingredients an alkaline earth metal oxide and aluminum oxide ($Al_2O_3$), ultra-fine particles having a mean particle size smaller by one order or more than that of the hydraulic material, a metal aggregate and a plasticizer.

BRIEF DESCRIPTION OF THE DRAWINGS

FIGS. 2a and 2b are cryo-SEM photographs showing sectional views of hardened bodies of cements;

DESCRIPTION OF THE INVENTION

Figure 1A:
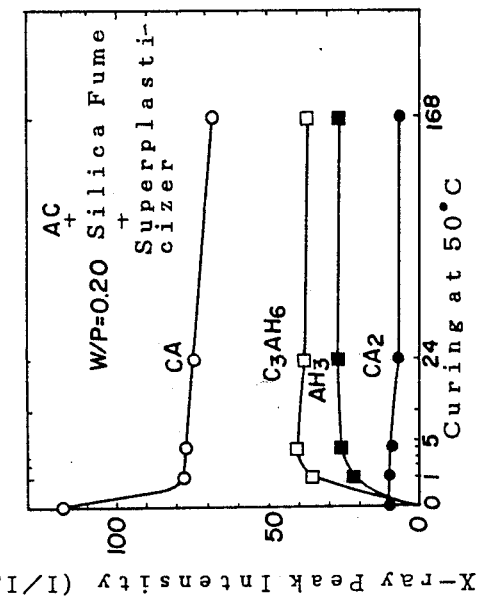
FIGS. 1a and 1b are graphs showing relative peak intensities of hydrates and unreacted materials measured by powder x-ray diffractiometry.

The present invention will be described further in detail.

The hydraulic material containing as main ingredients an alkaline earth metal oxide and aluminum oxide ($Al_2O_3$) is preferably mainly composed of CaO, BaO, SrO or a mixture thereof in combination with $Al_2O_3$. Most preferred hydraulic materials include alumina cement, calcium aluminate having a molar ratio of $CaO/Al_2O_3$ of less than 0.5 and calcium aluminate having a molar ratio of $CaO/Al_2O_3$ of 1.5 to 4.0.

The alumina cement may be used which contains $CaO \cdot Al_2O_3$ as a main ingredient and also may contain $CaO \cdot 2Al_2O_3$, $12CaO \cdot 7Al_2O_3$ or a mixture thereof, and a minor quantity of solid solution components. The commercially available products of the alumina cement include "Denka Alumina Cement No.1", "Denka Alumina Cement No.2" and "Denka High Alumina" trade names of the products by Denki Kagaku Kogyo KK, "Asano Alumina Cement", trade name of the product by Nippon Cement Co., Ltd. and "Asahi Fondu", a trade name of the product by Asahi Glass Co., Ltd.

The calcium aluminate having a molar ratio of $CaO/Al_2O_3$ of less than 0.5 may include a calcium aluminate mainly composed of $CaO \cdot 2Al_2O_3$—$CaO \cdot 6Al_2O_3$ mixture. It may further contain the aforementioned alumina cement or a minor quantity of solid solution components, in which case there is obtained above all an improved heat resistance.

The calcium aluminate having a molar ratio of $CaO/Al_2O_3$ in the range of 1.5 to 4.0 may include $12CaO \cdot 7Al_2O_3$, $3CaO \cdot Al_2O_3$, $4CaO \cdot Al_2O_3 \cdot Fe_2O_3$, $6CaO \cdot 2Al_2O_3 \cdot Fe_2O_3$ or a mixture thereof. It may also contain a small quantity of solid solution components, in which case the composition may exhibit early high strength and high bending strength.

Other hydraulic materials may be used which are mainly composed of $BaAl_2O_4$, $SrAl_2O_4$ or a mixture thereof.

Although not defined specifically, the mean particle size of the hydraulic material is preferably in the range between 10 and 30 microns.

As the ultra-fine particles employed in the present invention, those having a mean particle size which is smaller at least by one order or more and preferably two orders or more than the particle size of the hydraulic material, is preferred. Thus, the ultra-fine particles having a mean particle size less than 1 micron and preferably less than 0.5 micron, are preferred. Typical ultra-fine particles are silica dusts by-produced during the manufacture of ferrosilicon or metal silicon, the above described hydraulic materials, blast furnace slags, fly ash, alumina and silica obtained after crushing and classification according to particle size, dusts recovered from bag filters, and inorganic ultra-fine particles produced by the gaseous or liquid phase precipitation methods.

These ultra-fine particles may be used in an amount of 5 to 50 percent by weight and preferably 10 to 20 percent by weight to 95 to 50 percent by weight and preferably 90 to 80 percent by weight of the hydraulic material. With less than 5 percent by weight of these ultra-fine particles, the fluidity of the kneaded product becomes dilatantic such that it cannot be kneaded sufficiently. With more than 50 percent by weight of the ultra-fine particles, it becomes difficult to achieve the fluidity of the kneaded product. In any of these cases, it is difficult to achieve precision of transferability to the cast surface.

According to the present invention, metal aggregates are added to the hydraulic material composition. These metal aggregates may include iron powders, stainless steel powders, ferroalloy powders such as ferrosilicon or ferromanganese, alloy powders such as calcium silicon powders, especially ferroalloy powders subjected to water washing and drying. From the viewpoint of improving the bending strength, the iron and stainless steel powders, above all, the austenitic stainless steel powders and ferromanganese powders, are preferred. Although it is not quite clear why the use of iron powders, austenitic stainless steel powders or ferromanganese powders results in improved bending strength, it may be due to the fact that the particles themselves have high strength and superior adhesiveness. The particle size is not defined specifically and may be in the range from 0.1 to 5 mm. The smaller the particle size, the higher is the bending strength of the ultimate composition. However, since the composition tends to become more brittle as the particle size becomes smaller, the particle size is preferably selected to be in the range of from 0.1 to 0.3 mm. These metal aggregates are selectively used in an amount of not larger than 5 times by weight the total amount by weight of the hydraulic material and the ultra-fine particles.

The plasticizer employed in accordance with the present invention may include oxycarboxylic acids, such as citric acid, polycarboxylic acids or salts thereof; and superplasticizer such as condensation products of naphthalene sulfonic acid, alkylnaphthalene sulfonic acid or salts thereof with formaline, melamine resin sulfonic acid or salts, and refined ligninsulfonic acid or salts thereof. The plasticizer is preferably used in an amount of 1 to 5 parts by weight, more preferably 1.5 to 3 parts by weight to 100 parts by weight of the sum of the hydraulic material and the ultra-fine particles. With less than 1 part by weight of the plasticizer, it becomes difficult to achieve the fluidity and with higher than 5 parts by weight of the plasticizer, the reaction of hydration may be retarded excessively.

According to the present invention, set adjusting agents may be added, if required. Optimum results may be obtained by using the set adjusting agent in combination with the superplasticizer. The set adjusting agent includes inorganic acids such as sulfuric acid or boric acid; borates, sulfates, carbonates or hydrogen carbonates of alkali metals; organic acids such as citric acid and salts thereof; esters of phosphoric acid; calcium sulfate; and expansive additives. The set adjusting agent may be used in an amount of not larger than 3 parts by weight to 100 parts by weight of the sum of the hydraulic material and the ultra-fine particles. However, the set adjusting agent may be used in varying amounts according to the different applications and usages.

According to the present invention, inactive inorganic powders having a particle size of 1 to 100 microns may also be employed. The inactive inorganic powders employed in the present invention mean powders composed of particles of inorganic solid material that are inert to the reaction of hydration. The smaller the particle size of the inactive inorganic powders, the more significant is the surface activity of the particles, such that fluidity cannot be assured unless a large quantity of water is employed during kneading. On the other hand, the larger the particle size of the inactive inorganic powders, the worse becomes the transferability of the cast surface. Therefore, the particle size is in the range from 1 to 100 microns, preferably 5 to 88 microns and more preferably 5 to 44 microns. There is no limitation on the kinds of the ingredients or composition of the inactive inorganic powders. For example, oxide or non-oxide type ceramics may be employed. For example, powders of silica, alumina, mullite, magnesia, spinel, silicon carbide or nitrides, may be employed. In preparing these powders, various porcelain, refractories and aggregates are crushed and occasionally classified according to particle size.

It is not desirable that these powders be readily soluble in water and those powders showing moderate values of water absorption are preferred. When the heat resistance is required of the molded products, the inactive inorganic powders should be resistant to elevated temperatures at least higher than the temperature required for achieving the heat resistance. The inactive inorganic powders may be used in desired amounts in substitution for the hydraulic material. However, in view of fluidity, it is desirable that not less than 20 parts by volume of the inactive inorganic powders be used to 100 parts by volume of the sum of the inorganic powders and the hydraulic material. For improving contraction upon hydration significantly, it is desirable that 50 parts by volume be used, whereas the heat resistance may be improved by using not less than 80 parts by weight of the inorganic powders. It is desirable that not less than 90 parts by volume be used when the molded product is used under hostile heat environment such as at elevated temperatures or under thermal impacts. Although the compressive strength is not specifically influenced by the amount of the inorganic powders employed, it is desirable in view of improving the bending strength that the hydraulic material be contained in an amount of not less than 50 parts by volume and preferably not less than 80 parts by volume to 100 parts by volume of the sum of the hydraulic material and the inorganic powders. This results in improving the properties other than the bending strength while maintaining the high bending strength.

According to the present invention, metal powders having a particle size of 1 to 100 microns almost equal to that of the hydraulic material, may be employed. This results in improving the machinability as well as the mechanical strength of the hardened body obtained upon hydration. According to the present invention, it is critical that the particle size of the metal powders be not less than 1 micron and not larger than 100 microns, that is, almost equal to that of the hydraulic material since the excessively small particle size of the metal powders results in lowered fluidity and hence in increased water quantity required to obtain a prescribed fluidity and correspondingly lowered strength of the hardened body, while an excessively large particle size results in the powders scaling off, thus lowering the machinability of the molded product when the metal powders are used in larger amounts. As these metal powders, powders of iron, stainless steel or ferroalloys such as ferrochromium may be employed without any limitation on the ingredients or the composition thereof.

The metal powders may be used in substitution for the hydraulic material and in an amount of 10 to 95 parts by volume to 100 parts by volume of the sum of the hydraulic material and the metal powders. However, for maintaining high bending strength, it is preferred that the hydraulic material be contained in an amount of not less than 50 parts by volume and preferably not less than 80 parts by volume of the hydraulic material. This, however, does not apply to the case of special molding methods such as prepacked or post packed molding methods.

In addition to the above, various fibers or nettings may be used as ingredients. These fibers may include metal fibers such as cast iron fibers produced by chatter machining or stainless steel fibers, various natural and synthetic mineral fibers such as asbestos or alumina fibers, carbon fibers, glass fibers, and natural or synthetic organic fibers such as polypropylene, Vinylon, acrylonitrile or cellulose fibers. Steel rods or FRP rods conventionally employed as reinforcing materials may also be employed. These reinforcing materials are indispensable especially for molded articles of large size. Short metal fibers about 3 mm long and whiskers of short length are also desirable so as not to impair the fluidity. These fibers may be knitted in advance into a fabric which is then impregnated in a paste or mortar to a so-called preform. When the molded fabric is employed at elevated temperatures, heat-resistant fibers may be employed.

According to the present invention, it is desirable to use a small quantity of water for preventing the strength from being lowered due to conversion. Thus, it is desirable to use not more than 35 parts by weight of water and preferably not more than 25 parts by weight of water to 100 parts by weight of the sum of the hydraulic material and the ultra-fine particles.

The various ingredients may be kneaded in any desired manner provided that the kneading is carried out thoroughly. According to the present invention, it is preferred to perform a vacuum de-bubbling operation. More specifically, a vacuum casting machine, produced by Takagi Seisakusho Co. Ltd., an omni-mixer of vacuum type, produced by Chiyoda Technical & Industrial Co. Ltd. or a vacuum mixer produced by San-Ei Seisakusho, Ltd. may be used for de-bubbling. Alternatively, thin film formation may be resorted to for de-bubbling. Above all, the de-bubbling by formation of thin films is highly effective because high de-bubbling speed is thereby achieved. The de-bubbling operation is desirably performed under a vacuum of 50 to 70 mmHg in view of moisture evaporation. Although the de-bubbling time is not defined specifically, the de-bubbling time of 5 to 30 minutes is preferred.

It is also desirable that, by the vacuum de-bubbling operation, the amount of the air as measured in accordance with ASTM C-185-59 be lowered to about 1 to 2 percent and preferably to not higher than 1 percent.

It is also highly effective to vibrate simultaneously with the vacuum de-bubbling operation during casting to provide a molded product having high strength and improved bending strength.

The molded article obtained as above is cured by conventional ambient temperature curing, atmospheric pressure steam curing, high temperature and high pressure curing or high temperature curing in water. In addition thereto, dry curing at a temperature not less than 100° C. may be performed in accordance with the present invention for further improving the mechanical properties. Above all, high temperature processing at about 400° to 600° C. results in markedly improved mechanical properties. In this case, it is desirable to perform a preliminary drying at about 110° C. The curing time is usually three to seven days although it depends on the shape and composition of the article. The processing at high temperatures may be performed in such a manner that the maximum temperature is maintained for several hours. Depending on the size of the molded article, it may become necessary to take cautions so that temperature difference is not caused between the inside and the outside of the article, in which case a prolonged time of one or two days are required in sequentially elevating and decreasing the temperature.

EXAMPLES OF THE INVENTION

The description with reference to several specific Examples is given hereinbelow. It should be noted that these Examples are for illustration only and are not intended for limiting the scope of the invention.

EXAMPLE 1

Using mixing ratios of various components shown in the following Table-1, 2×2×8 cm samples were produced by cast molding and tests on the strength were performed in accordance with JIS R 5201.

The various components were kneaded for ten minutes using a vacuum omni-mixer produced by Chiyoda Technical & Industrial Co. Ltd. and then processed for ten minutes by vacuum de-bubbling at low speed. The resulting products were cured for seven days in the warm water maintained at 50° C. and then dry cured at 110° C. for three days. The compressive strength of the samples obtained after the curing was measured. The results are also shown in Table-1.

It is seen from Table-1 that the compressive strength is increased by dry curing no matter what cements are employed.

Above all, alumina cement is preferred for elevating the strength. Although the sample containing only the alumina cement is decreased in strength with lapse of time, the samples of the Run Nos. 3 and 4 were not seen to be decreased in strength when allowed to stand in room for one year.

The following ingredients or materials were employed.

Materials Used

White Portland Cement: Product of Chichibu Cement Co. Ltd., mean particle size, 10.3 microns Alumina cement: "Denka High Alumina Cement" having a mean particle size of 10 microns, produced by Denki Kagaku Kogyo KK Ultra-fine particles: Silica fume, produced by Japan Metals & Chemicals Co. Ltd.

Superplasticizer: A condensation product of β-naphthalenesulfonic acid and formaldehyde, produced and sold by Dai-ichi Kogyo Seiyaku Co. Ltd. under the trade name of "Selflow 110 P"

Metal aggregates: Reduced iron powders produced and sold by Japan Magnetic Dressing Co. Ltd. under the trade name of "Metalet" having a particle size not larger than 0.15 mm Fiber: Fibers of SUS 430, 50 microns in diameter and 25 mm in length, produced by Tokyo Rope Manufacturing Co. Ltd. by chatter machining Set adjusting agent: $Na_2SO_4$, reagent of the first grade

TABLE 1

| Run No. | Composition (part by wt.) | | | | | | | | Compressive strength (kgf/cm$^2$) |
|---|---|---|---|---|---|---|---|---|---|
| | White Portland cement | Alumina cement | Ultra-fine particle | Superplasticizer | Set adjusting agent | Metal aggregate | Water | Fiber | |
| 1 | 85 | 0 | 15 | 2 | 0 | 150 | 20 | 0 | 1,940 |
| 2 | 85 | 0 | 15 | 2 | 0 | 150 | 20 | 28 | 2,020 |
| 3 | 0 | 85 | 15 | 2 | 0.2 | 150 | 20 | 0 | 2,320 |
| 4 | 0 | 85 | 15 | 2 | 0.2 | 150 | 20 | 28 | 3,080 |

Run Nos. 1 and 2 are comparative experiments.

EXAMPLE 2

The operations were performed in the same way as in Example 1 but using a composition having a mixing ratio in weight parts shown in the following Table-2. The strength tests were conducted after the samples were cooled to room temperature in accordance with JIS R 5201.

For kneading, an omni-mixer of vacuum type, manufactured by Chiyoda Technical & Industrial Co., Ltd. was used. Thus, after kneading for ten minutes, vacuum de-bubbling was continued at low speed for ten minutes. The specimens were contained in a sealed state in a constant temperature box maintained at 50° C. for seven days and dry cured under various dry curing conditions shown in the following Table-3, after which the strengths of the various specimens were measured. The results are shown in the same Table-3.

TABLE 2

| Alumina cement | Ultra-fine particle | Superplasticizer | Set adjusting agent | Metal aggregate | Water | Fiber |
|---|---|---|---|---|---|---|
| 85 | 13 | 2 | 0.4 | 150 | 22 | 18 |

TABLE 3

| Run No. | Conditions | Strength (kgf/cm$^2$) | |
|---|---|---|---|
| | | Bending | Compressive |
| 1 | 50° C., sealed for 7 days | 348 | 1,900 |
| 2 | No. 1 specimen drying at 110° C. for 5 days | 441 | 3,035 |
| 3 | No. 2 specimen held at 200° C. for 3 hours followed by being allowed to cool | 464 | 2,850 |
| 4 | No. 2 specimen held at 400° C. for 3 hours followed by being allowed to cool | 507 | 2,540 |
| 5 | No. 2 specimen held at 600° C. for 3 hours followed by being allowed to cool | 578 | 2,600 |

Similar tests were conducted using the same mixing ratio as in Table-2 but using lithium carbonate and citric acid as the set adjusting agent. The results are shown in the following Table-4.

TABLE 4

| Run No. | Set adjusting agent (wt %) | | Compressive strength cured at 20° C. for 1 day | Compressive strength cured at 600° C. for 3 hrs after drying at 110° C. | Bending strength cured at 600° C. for 3 hrs after drying at 110° C. |
|---|---|---|---|---|---|
| | $Li_2CO_3$ | Citric acid | | | |
| 6 | 0.002 | 0.003 | 725 | 2980 | 614 |
| 7 | 0.02 | 0.03 | 725 | 2870 | 597 |
| 8 | 0.02 | 0.05 | 754 | 3120 | 678 |

(kgf/cm$^2$)
Materials used
$Li_2CO_3$: Reagent
Citric acid: Reagent

It is noted that the white Portland cement type specimens of the Example 1 Run Nos. 1 and 2 underwent explosion at 250° to 300° C. so that heat resistance thereof could not be maintained.

EXPERIMENTS

The following is our consideration and explanation as to how these results were brought about and as to the mechanism of how high strength could be obtained with hydrate of $3Ca_3Al_2O_3 \cdot 6 H_2O$ thought to have only poor strength.

The mechanism was considered using a pasty portion obtained by excluding the metal aggregate and the fiber from the composition of Table-2. For comparison, a specimen composed only of alumina cement, conventionally employed in castable refractories, was also tested, with the ratio of water to the hydraulic material (W/C ratio) set to 0.35.

Figure 1B:
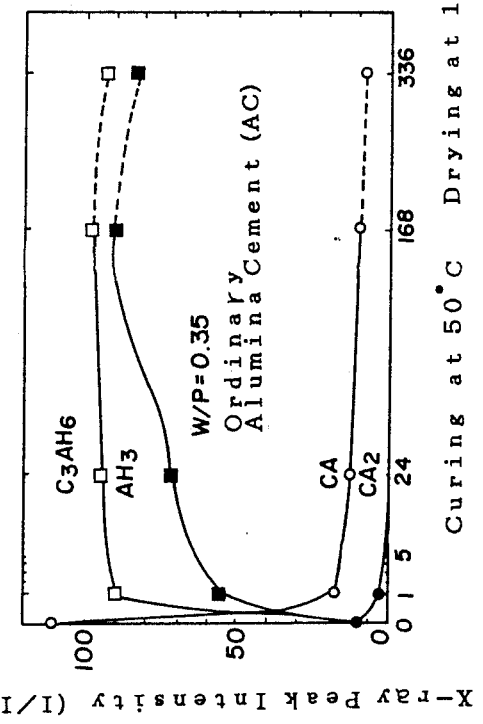

FIGS. 1a and 1b show relative peak intensities of hydrates and unreacted materials, obtained by powder X-ray diffractiometry. In the drawing and the following descriptions, C, A and H stand for CaO, $Al_2O_3$ and $H_2O$, respectively, while the figures stand for mol numbers. It is seen from FIG. 1a that, with the specimen composed only of alumina cement and having the W/C ratio of 0.35, the amount of the unreacted cements (CA and $CA_2$) is acutely decreased, whereas that of the hydrates $C_3AH_6$ and $AH_3$ is markedly increased. Conversely, it is seen from FIG. 1b that, with the sample according to the mixing ratio shown in Table-2 and having the water to hydraulic material plus ultra-fine particles (W/P ratio) of 0.2, not less than 50 percent in terms of the relative intensity of the unreacted cements (CA and $CA_2$) exists as compared with the case of FIG. 1a, whereas the hydrates $C_3AH_6$ and $AH_3$, although they are the same as those of FIG. 1a, are produced only in minor quantities.

In general, the hydrate $C_3AH_6$ was thought to be a main factor causing the strength to be lowered. However, high strength could be obtained with the composition shown in Table-2, even though the product was $C_3AH_6$. This may be thought to be ascribable to an extremely small size of the hydrate products as compared with those of the conventional alumina cement, as may be seen from the Cryo-SEM photographs (FIGS. 2a and 2b) of the fractured surfaces of the hardened masses obtained after curing.

FIGS. 2a and 2b show Cryo-SEM photographs of the hardened specimens composed of alumina cement as conventionally and having the W/C ratio of 0.35 and those composed of alumina cement, silica fume and superplasticizer and having the W/P ratio of 0.20, respectively.

Figure 3:
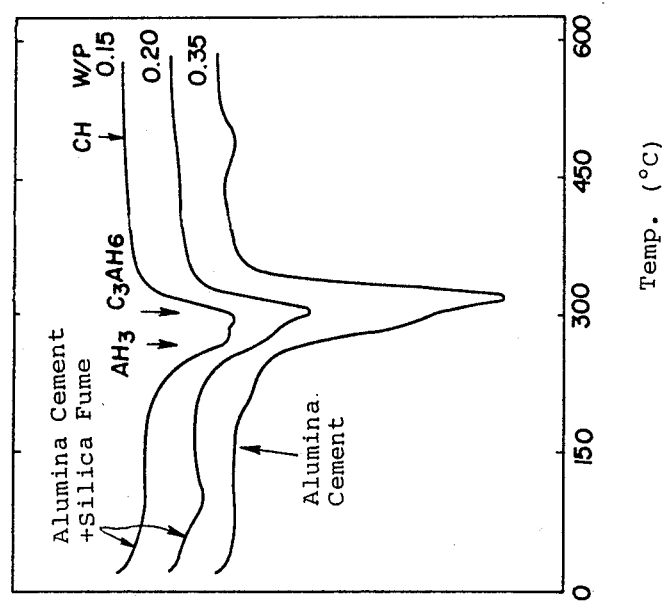
FIG. 3 is a graph showing differential scanning calorimetry curves of alumina cement pastes at various water/powder ratios.

When silica fume is used as ultra-fine particles in the composition of Table-2, not only $C_3AH_6$ and $AH_3$ but also calcium silicate hydrate (C-S-H) are produced as the hydrates, thus causing a different ratio of the evolved $C_3AH_6$ and $AH_3$. FIG. 3 shows the results of analysis obtained with the use of differential scanning calorimetry (DSC). It is seen from this figure that, in the case of the composition of Table-2, the evolution peak ratios of $AH_3$ and $C_3AH_6$ approach to each other. This may be ascribable to the fact that the following reaction

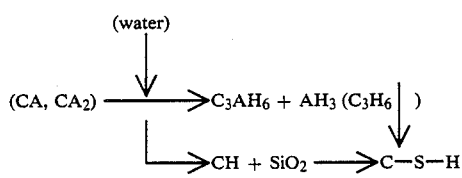

Figure 4:
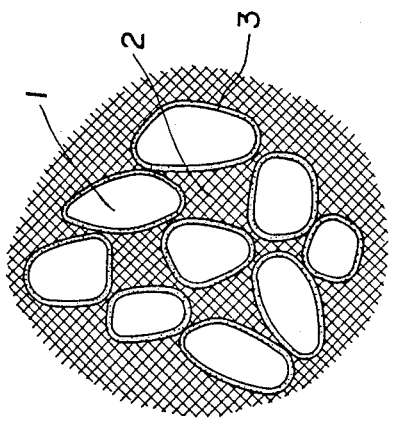
FIG. 4 is a schematic view showing the structure of the hardened body of the hydraulic material composition of the invention.

Thus, the structure of the hardened mass may be comprehended as shown diagrammatically in FIG. 4 wherein the densely packed unreacted cement CA or $CA_2$ (numeral 1) acts as the inner filler which is solidified by small masses of $C_3AH_6$, $AH_3$ and C-S-H (numeral 2). The presence of such unreacted cement in larger quantities is thought to be responsible for the heat resistance exhibited by the hardened mass as shown in FIG. 4 even though the cement ratio in the mortar concrete is markedly higher than in the case of the conventional castable refractories. This is of great significance from the viewpoint of high bending strength and high heat resistance. In FIG. 4 the numeral 3 denotes a hydrate layer surrounding the unreacted cement 1.

Also the bending strength is markedly improved by calcination at elevated temperatures, possibly due to different products being yielded in the dehydrating reaction taking place at a temperature of between 200° and 400° C.

$C_3AH_6$ and $AH_3$ start to be dehydrated at about 200° C. to yield $C_{12}A_7$ and CH. However, in the present experiments, CH thus yielded is reacted with $AH_3$ excess in amount as compared with usual cases. As a result of this recyclic reaction, there is no CH remaining in the reaction system. Thus, it may be presumed that, at the temperatures of 400° to 600° C., the hardened mass is constituted by bonds including intermixed chemical bonds of $C_{12}A_7$, amorphous $Al_2O_3$ and C-S-H. It is also presumed that, since $C_3AH_6$ is extremely small in size, $C_{12}A_7$ welded as described above is also extremely small in size.

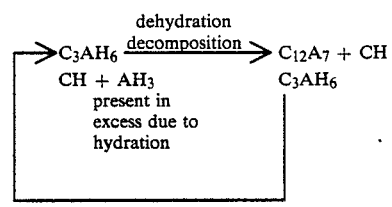

Figure 5:
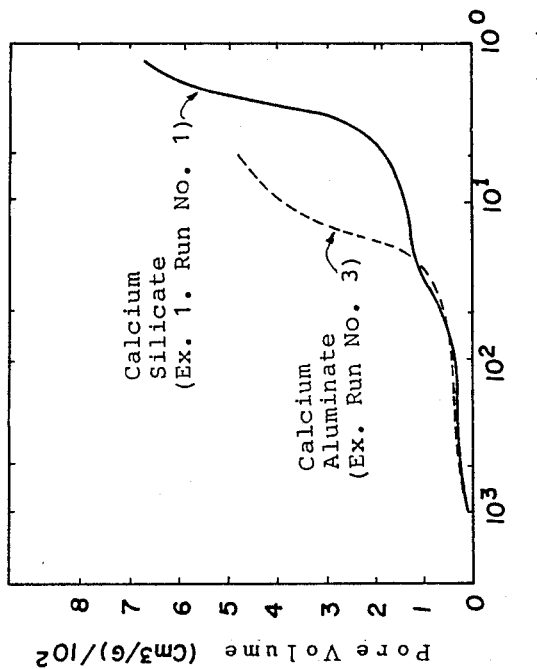
FIG. 5 is a graph showing the distribution of pore diameter of hardened hydraulic material compositions.

When the conventional Portland cement, silica fume and superplasticizer are combined together at the low W/P ratio, as in Example 1 Run Nos. 1 or 2, for example, the samples undergo explosion when the temperature exceeds 250° C. during high temperature processing. This is avoided in the present experiments, possibly due to the different pore structure of the hardened body. FIG. 5 shows the pore diameter distribution, obtained by mercury pressurizing process, of a sample obtained in such a way that the pasty portion of the Example 1 Run Nos. 1 and 3 compositions were cured at 50° C. for one day, pulverized, processed with acetone for terminating the hydration and dried in a $N_2$ stream. It is seen from this figure that the Example 1 Run No. 3 specimen has pores larger in size. Also, with the total porosities (A) and (B) for pressure elevation and pressure decrease, respectively, the ratio (A-B)/A for Example 1 Run No. 1 is 75 to 80 percent, whereas it is about 60 percent for Run No. 3. This is thought to be due to the Portland cement system of the Run No. 1 having the pore structure through which mercury may pass less easily than in the case of Run No. 3, such as that in the shape of an ink bottle or that having larger tortosity. Such difference in the pore structure is thought to be one of the reasons why the composition of Run No. 3 can be processed at higher temperatures without the risk of explosion.

It is also presumed that the metal particles, such as iron powders, undergo expansion due to oxidation on processing at elevated temperatures, while the deposition thereof tends to be increased, as evidenced by the SEM photographs. It is thought that this also contributes to the improved bending strength.

EXAMPLE 3

The molding operation was performed in the same way as in Example 1 using the composition of the mixing ratio shown as Run No. 4 in Example 1 Table-1. The molded products were cured under various curing conditions shown in the following Table-5 and dry cured at 110° C. for three days, after which the compressive strengths of the products were measured. The results are shown in the following Table-5.

TABLE 5

| Run No. | Conditions | Compressive strength (kgf/cm$^2$) |
|---|---|---|
| 1 | Cured for 48 hrs at 20° C. under RH 80% and then for 5 days in water at 20° C. | 1,940 |
| 2 | Heated to 75° C. at a temperature raising rate of 15° C./hr and cured for 5 hrs at 75° C. | 2,265 |
| 3 | Seald for 3 hrs at 50° C. and then cured for 3 hrs at 180° C. | 3,080 |

It is seen from Table-5 that the dry curing according to the present invention, when performed after the conventional curing, is effective in improving the strength, no matter what kind of the conventional curing is performed.

EXAMPLE 4

Using the compositions shown in Table-6, the various components were kneaded for ten minutes in an omnimixer of vacuum type of 30 liter capacity, manufactured by Chiyoda Technical & Industrial Co. Ltd. and debubbled for ten minutes under a vacuum of 50 mmHg. 4×4×16 cm specimens were prepared and sealed in polyethylene sheets and each of the resulting products was cured at 50° C. for seven days. Tests on strength were conducted in accordance with JIS R 5201. The results are shown in Table-5.

Materials Used

Cement: White Portland cement, produced and sold by Chichibu Cement Co. Ltd.

Alumina Cement: "Denka Alumina Cement No. 1", produced by Denki Kagaku Kogyo KK

Ultra-fine Particles: Silica fume, produced by Japan Metals & Chemicals Co. Ltd.

Superplasticizer: "Selflow 110P", produced by Dai-ichi Kogyo Seiyaku Co. Ltd.

Set adjusting agent: Sodium sulfate reagent, first grade

Aggregate A: Dead burnt alum shale, primarily produced in China, particle size of not larger than 0.3 mm, ultimately produced by Fuji Mineral Materials Co. Ltd.

Metal aggregate B: Metal particles, SUS 304 L stainless steel particles, produced by Daido Special Steel Co. Ltd., not larger than 100 mesh size Metal aggregate C: Metal particles, SUS 316 L stainless steel particles, produced by Daido Special Steel Co. Ltd., not larger than 100 mesh size Metal aggregate D: Metal particles, SUS 430 L stainless steel particles, produced by Daido Special Steel Co. Ltd., not larger than 100 mesh size Metal aggregate E: Metal Particles, reduced iron particles, "Metalet", produced by Nippon Magnetic Dressing Co. Ltd., not larger than 0.15 mm particle size Metal aggregate F: Metal Particles, ferromanganese, produced by Japan Metals & Chemicals, pulverized product, with particle size of not larger than 0.3 mm formed.

TABLE 6

| Run No. | Composition (part by wt.) | | | | | | Bending strength (kgf/cm$^2$) | Bending strength/ Compressive strength |
|---|---|---|---|---|---|---|---|---|
| | White Portland cement | Alumina cement | Ultra-fine particle | Superplasticizer | Water | Aggregate | | |
| 1 | 85 | 0 | 15 | 2 | 20 | A 100 | 213 | 0.127 |
| 2 | 0 | 85 | 15 | 2 | 20* | B 150 | 340 | 0.184 |
| 3 | 0 | 85 | 15 | 2 | 20* | C 150 | 320 | 0.197 |
| 4 | 0 | 85 | 15 | 2 | 20* | D 150 | 285 | 0.171 |
| 5 | 0 | 85 | 15 | 2 | 20* | E 150 | 366 | 0.191 |
| 6 | 0 | 85 | 15 | 2 | 20* | F 150 | 320 | 0.210 |

*1% Na$_2$SO$_4$ solution
Run No. 1: Comparative experiment

EXAMPLE 5

Using the compositions shown in Table-7, the procedure of the preceding Example 4 was followed but under varying the wet air curing temperatures, and the bending strengths of the produced samples were measured. For any cases tested, the alumina cement composition showed higher values. The ageing of the material was set to 14 days. The results are shown in Table-7. The materials used were the same as those of the preceding Example 4.

TABLE 7

| Run No. | Composition (part by wt.) | | | | | | | Bending strength (kgf/cm$^2$) | | | | |
|---|---|---|---|---|---|---|---|---|---|---|---|---|
| | White Portland cement | Alumina cement | Ultra-fine particle | Superplasticizer | Water | Na$_2$SO$_4$ | Metal aggregate | 20° C. | 40° C. | 50° C. | 80° C. | 100° C. |
| 1 | 80 | 0 | 20 | 2 | 20 | — | E 150 | 171 | 280 | 257 | 251 | 200 |
| 2 | 0 | 80 | " | " | " | 0.2 | " | 284 | 350 | 302 | 302 | 285 |

Run No. 1 is a comparative experiment and Run No. 2 is a working example.

EXAMPLE 6

Using mixing ratios shown in Table-8 at 20° C. and the relative humidity of 80%, the various components were kneaded for five minutes in a vacuum mixer of 5 liter capacity, manufactured by San-Ei Seisakusho, Ltd.

and de-bubbled in vacuum of 70 mm Hg for a prescribed time. 4×4×16 cm samples were produced by cast molding, sealed at 20° C. and a relative humidity of 80% and cured for a prescribed time. The cured products were tested for strength for 3 hours and 28 days in accordance with JIS R-5201. The time until which penetration resistance reached 4,000 psi on testing with a tester was taken as setting time. The results are shown in Table-8.

Materials used

CA-A: White Portland cement, produced by Chichibu Cement Co. Ltd.
CA-B: Alumina cement, "Dena High Alumina Cement", produced by Denki Kagaku Kogyo KK
CA-C: $C_4AF$ and $CaCO_3/Fe_2O_3$ at a ratio of 400/102/160 were mixed together, maintained for one hour at 1350° to 1360° C., calcined and pulverized to a mean particle size of 12 microns.
CA-D: $C_{12}A_7$ and $CaO/Al_2O_3$ at a ratio of 45/55 were mixed together, electro-fused at 1600° C., cooled rapidly and pulverized to a mean particle size of 8 microns
Ultra-fine Particles: Silica fume, produced by Japan Metals & Chemicals Co. Ltd.
Superplasticizer: A condensation product of β-naphthalenesulfonic acid and formaldehyde, produced and sold by Dai-ich Kogyo Seiyaku Co. Ltd. under the trade name of "Selflow 110P"
Metal aggregate: Reduced iron particles produced by Nippon Magnetic Dressing Co. Ltd. under the trade name of "Metalet" having a particle size of not larger than 0.15 mm
Fiber: Fibers of SUS stainless steel with a diameter of 50 μm and a length of 2.5 mm, produced by Tokyo Rope Manufacturing Co. Ltd. by chatter machining
Set adjusting agent E: $Na_2SO_4$, reagent
Set adjusting agent F: Boric acid, reagent
Set adjusting agent G: Citric acid, reagent obtained sample was sealed and cured in a polyethylene bag at 50° C. for seven days and tested for strength.

TABLE 9

| Run No. | Composition (part by wt.) | | | | | | Strength (kgf/cm²) | |
| | CA | Ultra-fine particle | Superplasticizer | Metal aggregate | Fiber | Set adjusting agent | Water | Compressive | Bending |
| --- | --- | --- | --- | --- | --- | --- | --- | --- | --- |
| 1 | C85 | 15 | 2 | 150 | 18 | F0.8 | 22 | 2,150 | 686 |

The sample was further cured at 110° C. for three days. The bending strength of the sample was 805 kgf/cm².

EXAMPLE 8

The compositions shown in Table-10 were kneaded by a high speed mixer and vibration molded by casting by a table vibrator to produce 2×2×8 cm samples. The samples were cured for seven days in warm water at 50° C. and dry cured at 110° C. for seven days, after which the strength tests of the samples were conducted in accordance with JIS R-5201.

Materials Used

Clinker-A: $C_4AF$ and $CaCO_3/Al_2O_3/Fe_2O_3$ were mixed to give a prescribed molar ratio and the mixture was maintained at 1350° to 1360° C. for one hour, sintered and pulverized to a mean particle size of 12 microns
Clinker B: $CA_2$-$CA_6$, $CaCO_3$ and $Al_2O_3$ were mixed together to give a prescribed molar ratio, electro-fused, rapidly cooled in air and pulverized to a mean particle size of 10 microns
Clinker C: $BaAl_2O_4$, $BaCO_3$ and $Al_2O_3$ were mixed to give a prescribed molar ratio, maintained at 1500° C. for two hours, sintered, rapidly cooled in air and pulverized to a mean particle size of 11.3 microns
Clinker-D: $CA_2$, $CaCO_3$ and $Al_2O_3$ were electro-fused and rapidly cooled to a mean particle size of 11 microns
Ultra-fine particles: Silica fume, manufactured by Japan Metals & Chemicals Co. Ltd.
Super plasticizer: A condensation product of β-naphthalene sulfonic acid and formaldehyde, produced and sold by Dai-ichi Kogyo Seiyaku Co. Ltd. under the trade name of "Selflow 110P"
Metal aggregate-E: Iron powders produced and sold by

TABLE 8

| Run No. | Composition (part by wt.) | | | | | | De-bubbling time (Min.) | Setting time (hr) | Strength (kgf/cm²) | | |
| | CA | Utlra-fine particle | Superplasticizer | Set adjusting agent | Metal aggregate | Water | | | 3 hrs Compressive | 28 days Compressive | Bending |
| --- | --- | --- | --- | --- | --- | --- | --- | --- | --- | --- | --- |
| 1 | A85 | 15 | 2 | 0 | 150 | 22 | 5 | 12 | — | 1,405 | 227 |
| 2 | B85 | " | " | E0.2 | " | " | " | 24 | — | 1,460 | 314 |
| 3 | C85 | " | " | F0.8 | " | " | 3 | 0.25 | 222 | 1,460 | 362 |
| 4 | D85 | " | " | F0.4 | " | " | " | 0.50 | 160 | 1,440 | 366 |

Run No. 1: Comparative experiment

EXAMPLE 7

Using the mixing ratio shown in Table-9, the various components were kneaded in the same way as in Example 6. The fiber (SUS 631) was mixed into the resulting product and the resulting mixture was molded and de-aerated in vacuum while being vibrated on a vibrator to produce a 4×4×16 sample with minute attention. The Dowa Iron Powder Co. Ltd. under the trade name of "NC", with a particle size of 0.15 to 0.3 mm
Metal aggregate-F: Iron powders produced and sold by Dowa Iron Powder Co. Ltd. under the trade name of "A", with a particle size of not larger than 0.15 mm
Set adjusting agent-G: $Na_2SO_4$, reagent
Set adjusting agent-H: Boric acid, reagent
Set adjusting agent-I, Citric acid, reagent

TABLE 10

| Run No. | Clinker | Ultra-fine particle | Superplasticizer | Metal aggregate | Set adjusting agent | Water | Strength (kgf/cm$^2$) Compressive | Bending |
|---|---|---|---|---|---|---|---|---|
| 1 | A85 | 15 | 2 | E150 | G0.3 I0.3 | 22 | 2920 | 478 |
| 2 | B85 | 15 | 2 | E75 F75 | G0.3 I0.3 | 22 | 2880 | 305 |
| 3 | C85 | 15 | 2 | E75 F75 | H0.4 | 22 | 2720 | 312 |
| 4 | D85 | 15 | 2 | NC75 A75 | G0.3 I0.3 | 22 | 2740 | 338 |

EXAMPLE 9

The components having the mixing ratios by weight shown in Table-11 were kneaded with prescribed amounts of water in a mortar mixer of 2 liter capacity to produce 4×4×16 cm samples in accordance with JIS-R-5201. These samples were wet cured at 50° C. for seven days and tested for compressive strength. These samples were also checked for machinability by planing by a miller and boring by a drilling machine. The results are shown in Table-11.

Material Used

Cement "A": "Alumina cement No. 2" produced by Denki Kagaku Kogyo KK
Cement "B": White Portland cement produced by Chichibu Cement Co. Ltd. with a mean particle size of 10.3 microns as measured by a light transmission method
Reduced iron powders: Iron powders produced by Dowa Iron Powder Co. Ltd.; completely passed through a 200 mesh screen; particle size of not larger than 74 microns, as measured by a screening method
Superplasticizer: "Selflow 110P" a product of Dai-ichi Seiyaku Kogyo Co. Ltd.; mainly composed of a condensation product of an alkylnaphthalene sulfonic acid and formaldehyde
Metal aggregate: Iron powders with a particle size of 0.15 to 1.0 mm, produced by Dowa Iron Powder Co. Ltd.; the asterisk mark denotes river sand having a particle size of 0.3 to 1.2 mm.
Na$_2$SO$_4$: reagent

TABLE 11

| Run No. | Cement | Metal powder (Reduced iron powder) | Ultra-fine particle | Superplasticizer | Set adjusting agent | Metal aggregate | Water | Compressive strength (kgf/cm$^2$) | Machinability Miller | Drilling machine |
|---|---|---|---|---|---|---|---|---|---|---|
| 1 | B83 | 0 | 17 | 2 | 0 | 120 | 20 | 1150 | × | × |
| 2 | A50 | 38 | 11 | 2 | 0.12 | 120 | 20 | 1570 | O | O |
| 3 | A70 | 20 | 10 | 2 | 0.12 | 120 | 20 | 1820 | O | O |
| 4 | A50 | 35 | 15 | 2 | 0.12 | 120 | 30 | 1350 | O | O |

Run No. 1: Comparative Experiment
O: Easily machined
×: Difficult in machining

EXAMPLE 10

The components shown in Table-12 were kneaded for three minutes in a mortar mixer at 20° C. and a relative humidity of 80% at the mixing ratios shown therein and the resulting mixtures were de-bubbled in vacuum for two minutes by a vacuum mixer produced by San-Ei Seisakusho Co. Ltd. and vibration cast molded to 2×2×8 cm samples. These samples were cured at 50° C. in wet air for seven days and then at 110° C. for seven days and calcined at 600° C. for three hours. The strengths of these samples are shown in Table-13.

Materials Used

Ultra-fine particles: An alumina produced and sold by Alcoa Co. Ltd. under the trade name of "A-16SG" with the mean particle size of 0.2 to 0.5 microns, as measured with TEM
Plasticizers: Lithium citrate and sodium citrate, reagents
The same materials as those of Example 1 were used except those shown above.

TABLE 12

| Run No. | High alumina cement | Ultra-fine particle Silica fume | Ultra-fine particle Al$_2$O$_3$ | Plasticizer 110P | Plasticizer Lithium citrate | Plasticizer Sodium citrate | Set adjusting agent (Na$_2$SO$_4$) | Metal aggregate (Metalet) | Fiber (sus430) | Water | Table flow (mm) |
|---|---|---|---|---|---|---|---|---|---|---|---|
| 1 | 88 | 12 | — | 2 | — | — | 0.3 | 150 | 18 | 23 | 234 |
| 2 | 85 | 15 | — | 2 | — | — | " | " | 18 | 23 | 237 |
| 3 | 83 | 17 | — | 2 | — | — | " | " | 18 | 23 | 246 |
| 4 | 78 | 12 | — | 2 | — | — | " | " | 18 | 23 | 216 |
| 5 | 50 | 50 | — | — | 0.5 | 1.0 | — | " | — | 22 | 273 |
| 6 | 50 | — | 50 | — | 0.5 | 1.0 | — | " | — | 22 | 276 |
| 7 | 60 | — | 40 | 2.0 | — | — | 0.2 | 200 | — | 20 | 285 |
| 8 | 50 | — | 50 | 2.0 | — | — | 0.2 | 200 | — | 20 | 287 |

TABLE 12-continued

| Run No. | High alumina cement | Ultra-fine particle Silica fume | Al₂O₃ | Plasticizer 110P | Lithium citrate | Sodium citrate | Set adjusting agent (Na₂SO₄) | Metal aggregate (Metalet) | Fiber (sus430) | Water | Table flow (mm) |
|---|---|---|---|---|---|---|---|---|---|---|---|
| 9 | 60 | — | 40 | 2.0 | — | — | 0.2 | 200 | — | 16 | 223 |

TABLE 13

| | 50° C. 7 days and 110° C. 7 days (kgf/cm²) | | 600° C. 3 hours | |
|---|---|---|---|---|
| Run No. | Compressive strength | Bending strength | Compressive strength | Bending strength |
| 1 | 2710 | 416 | 2690 | 588 |
| 2 | 2880 | 485 | 2930 | 633 |
| 3 | 2820 | 424 | 3230 | 588 |
| 4 | 2830 | 454 | 3070 | 634 |
| 5 | 1730 | 313 | — | — |
| 6 | 1820 | 321 | — | — |
| 7 | 1975 | 309 | — | — |
| 8 | 1609 | 295 | — | — |
| 9 | 2576 | 385 | — | — |

EXAMPLE 11

The various components shown in Table-14 were kneaded for five minutes in a mortar mixer at the mixing ratios shown therein and cast into 4×4×16 cm molds. The cast products were cured at 50° C. for seven days and dry cured for one day at 180° C., after which they were calcined to a temperature of 600° to 800° C. The results are shown collectively in Table-14.

Materials Used

Inactive inorganic powders: Corundum sand having a particle size of 0.3 to 1 mm was crushed for one day in a ball mill to a mean particle size of 18.5 microns as measured by a light transmission method Metal aggregates: Iron powders produced and sold under the trade names of "NC" and "A" produced by Dowa Iron Powder Co., Ltd. and BrO (bronze) powders produced by Dowa Kogyo Co. Ltd.

Cement: "Denka Alumina Cement No. 1", produced by Denki Kagaku Kogyo KK

The same materials as those of the preceding Example 1 were used except those shown above.

The hydraulic material composition of the present invention provides a high strength hardened body that is superior above all in bending strength and heat resistance and that has sustained fluidity and transferability that was not possible in the prior art. Thus, the hydraulic material composition may be used as a variety of molding materials having a number of useful applications and usages. Examples of these applications and usages include various ceramic substitutes and building materials. Especially, in consideration of the surface transferability and moldability at ambient temperatures, the hydraulic material composition of the present invention may be used advantageously as casting molds or cores for various metals, casting molds or cores for various metals making use of thermosetting resins as the binder, gravity casting molds or low pressure casting molds, casting molds for various heat-resistant resins or engineering plastics, casting molds for reaction injection molding (RIM), sheet molding compound (SMC) or for bulb molding compound (BMC), stamping casting mold or the like casting mold for FRP, master molds for plasma flame spraying, molds for powder metallurgy for high temperature sintering, casting molds for glass ceramics or as high temperature press molds.

Although the present invention has been described with reference to the specific examples, it should be understood that various modifications and variations can be easily made by those skilled in the art without departing from the spirit of the invention. Accordingly, the foregoing disclosure should be interpreted as illustrative only and not to be interpreted in a limiting sense. The present invention is limited only by the scope of the following claims.

What is claimed is:

1. A hydraulic material composition having high strength comprising a hydraulic material containing as main ingredients an alkaline earth metal oxide and aluminum oxide (Al₂O₃), ultra-fine particles selected from the group consisting of silica, said hydraulic materials, blast furnace slags, fly ash, alumina and a mixture thereof and having a mean particle size smaller by one order or more than that of said hydraulic material, said hydraulic material composition containing 95 to 50%

TABLE 14

| Run No. | Cement | Inactive inorganic powder | Ultra-fine particle | Super-plasticizer | Metal Aggregate | Fiber | Water | Set adjusting agent (Na₂SO₄) | Dry curing (at 50° C. for 7 days and then) at 180° C. for 1 day | Compressive strength (kgf/cm²) 600° C. 3 hrs. | 700° C. 3 hrs. | 800° C. 3 hrs. |
|---|---|---|---|---|---|---|---|---|---|---|---|---|
| 1 | 65 | 10 | 25 | 2 | Metalet 150 | — | 24 | 0.3 | 306 | 425 | — | 394 |
| 2 | 60 | 20 | 20 | 2 | Bro 150 | 18.0 | 17 | 0.3 | 373 | 375 | 375 | — |
| 3 | 60 | 20 | 20 | 2 | NC + A 150 | 18.0 | 22 | 0.3 | 488 | 470 | 558 | 516 |
| 4 | 40 | 40 | 20 | 2 | Metalet 150 | — | 21 | 0.3 | 298 | 403 | — | — | by weight of the hydraulic material and 5 to 50% by weight of the ultrafine particles, a metal aggregate having a particle size from about 0.1 to 0.3 mm, said metal aggregate present in an amount not more than 5 times by weight the total amount by weight of said hydraulic material and said ultra-fine particles, and a plasticizer, said plasticizer present in an amount of between about to 15 parts by weight to 100 parts by weight of the sum of said hydraulic material and said ultra-fine particles.

2. The hydraulic material composition according to claim 1, wherein said alkaline earth metal oxide is selected from the group consisting of CaO, BaO, SrO and a mixture thereof.

3. The hydraulic material composition according to claim 1, wherein said hydraulic material is an alumina cement.

4. The hydraulic material composition according to claim 3, wherein said alumina cement contains $CaO \cdot Al_2O_3$ as a main ingredient.

5. The hydraulic material composition according to claim 4, further comprising a component selected from the group consisting of $CaO \cdot 2Al_2O_3$, $12CaO \cdot 7Al_2O_3$, solid solutions components of $CaO \cdot 2Al_2O_3$, solid solution components of $12CaO \cdot 7Al_2O_3$ and a mixture thereof.

6. The hydraulic material composition according to claim 1, wherein said hydraulic material is a calcium aluminate having a molar ratio of $CaO/Al_2O_3$ of less than 0.5.

7. The hydraulic material composition according to claim 6, wherein said calcium aluminate contains a mixture of $CaO \cdot 2Al_2O_3$ phase and $CaO \cdot 6Al_2O_3$ phase as a main ingredient.

8. The hydraulic material composition according to claim 7, further comprising a component selected from the group consisting of an alumina cement, solid solution components of said alumina cement and a mixture thereof.

9. The hydraulic material composition according to claim 1, wherein said hydraulic material is a calcium aluminate having a molar ratio of $CaO/Al_2O_3$ of 1.5 to 4.0.

10. The hydraulic material composition according to claim 9, wherein said calcium aluminate contains as a main ingredient a component selected from the group consisting of $12CaO \cdot 7Al_2O_3$, $3CaO \cdot Al_2O_3$, $4CaO \cdot Al_2O_3 \cdot Fe_2O_3$, $6CaO \cdot 2Al_2O_3 \cdot Fe_2O_3$ and a mixture thereof.

11. The hydraulic material composition according to claim 10, further comprising solid solution components.

12. The hydraulic material composition according to claim 1, wherein said hydraulic material is selected from the group consisting of $BaAl_2O_4$, $SrAl_2O_4$ and a mixture thereof.

13. The hydraulic material composition according to claim 1, wherein said hydraulic material has a mean particle size of 10 to 30 microns.

14. The hydraulic material composition according to claim 1, wherein said ultra-fine particle has a mean particle size of less than 1 micron.

15. The hydraulic material composition according to claim 1, wherein said metal aggregate is selected from the group consisting of iron powders, stainless steel powders, alloy powders and a mixture thereof.

16. The hydraulic material composition according to claim 15, wherein said alloy is selected from the group consisting of ferrosilicon powders, ferromanganese powders and a mixture thereof.

17. The hydraulic material composition according to claim 1, wherein said plasticizer is a superplasticizer.

18. The hydraulic material composition according to claim 1, wherein said plasticizer is selected from the group consisting of oxycarboxylic acids, salts of said oxycarboxylic acids, polycarboxylic acids, salts of said polycarboxylic acids, condensation products of naphthalene sulfonic acid and formaline, condensation products of alkylnaphthalene sulfonic acid and formaline, salts of said condensation products, melamine resin sulfonic acid, salts of said melamine resin sulfonic acid, refined ligninsulfonic acid, salts of said refined ligninsulfonic acid and a mixture thereof.

19. The hydraulic material composition according to claim 1, further comprising a set adjusting agent.

20. The hydraulic material composition according to claim 19, wherein said set adjusting agent is selected from the group consisting of sulfuric acid, boric acid, alkali metal borate, alkali metal sulfate, alkali metal carbonates, alkali metal hydrogen carbonates, citric acid, salts of citric acid, esters of phosphoric acid, calcium sulfate, expansive additives and a mixture thereof.

21. The hydraulic material composition according to claim 19, wherein said set adjusting agent is contained in an amount of not larger than 3 parts by weight to 100 parts by weight of the sum of said hydraulic material and said ultra fine particles.

22. The hydraulic material composition according to claim 1, further comprising inactive inorganic powders having a particle size of 1 to 100 microns, said inactive inorganic powder present in an amount of 20 parts by volume to 100 parts by volume of the sum of the inorganic powders and the hydraulic material.

23. The hydraulic material composition according to claim 22, wherein said inactive inorganic powder is selected from the group consisting of silica powders, alumina powders, mullite powders, magnesia powders, spinel powders, silicon carbide powders, nitride powders and a mixture thereof.

24. The hydraulic material composition according to claim 1, further comprising metal powders having a particle size of 1 to 100 microns.

25. The hydraulic material composition according to claim 24, wherein said metal powder is selected from the group consisting of iron powders, stainless steel powders, ferroalloy powders and a mixture thereof.

26. The hydraulic material composition according to claim 24, wherein said metal powder is contained in an amount of 10 to 95 parts by volume to 100 parts by volume of the sum of the hydraulic material and the metal powders.

27. The hydraulic material composition according to claim 1, wherein not more than 35 parts by weight of water is added to 100 parts by weight of the sum of said hydraulic material and said ultra-fine particles.

28. A process for producing a hardened product from the hydraulic material composition having high strength according to claim 1, comprising subjecting said hydraulic material composition to dry curing at a temperature not lower than 100° C.

* * * * *